US011275660B2

(12) United States Patent
Nguyen et al.

(10) Patent No.: US 11,275,660 B2
(45) Date of Patent: Mar. 15, 2022

(54) MEMORY MIRRORING IN AN INFORMATION HANDLING SYSTEM

(71) Applicant: DELL PRODUCTS, L.P., Round Rock, TX (US)

(72) Inventors: Tuyet-Huong Thi Nguyen, Cedar Park, TX (US); Mukund P. Khatri, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 72 days.

(21) Appl. No.: 16/112,942

(22) Filed: Aug. 27, 2018

(65) Prior Publication Data

US 2020/0065203 A1 Feb. 27, 2020

(51) Int. Cl.
*G06F 11/20* (2006.01)
*G06F 3/06* (2006.01)

(52) U.S. Cl.
CPC .......... *G06F 11/2087* (2013.01); *G06F 3/065* (2013.01); *G06F 3/067* (2013.01); *G06F 3/0619* (2013.01); *G06F 3/0659* (2013.01); *G06F 2201/82* (2013.01)

(58) Field of Classification Search
CPC ............. G06F 11/1068; G06F 11/1048; G06F 11/0793; G06F 11/3476; G06F 11/073; G06F 11/1666; G06F 11/0766; G06F 11/2087; G06F 2212/403; G06F 3/0619; G06F 3/065; G06F 3/0659; G06F 3/067; G06F 2201/82; G11C 29/42; G11C 16/349; H04L 41/06; H04L 1/0009
See application file for complete search history.

(56) References Cited

U.S. PATENT DOCUMENTS

| | | | | |
|---|---|---|---|---|
| 5,784,274 A | * | 7/1998 | Murayama | H04L 41/06 370/242 |
| 7,028,156 B1 | * | 4/2006 | Kiselev | G06F 11/1435 711/161 |
| 8,810,216 B2 | * | 8/2014 | D'Angelo | H05B 45/37 323/271 |
| 8,898,408 B2 | * | 11/2014 | Berke | G06F 11/167 711/162 |
| 9,177,496 B2 | * | 11/2015 | John | G09G 3/006 |
| 10,275,307 B2 | * | 4/2019 | Lesartre | G06F 11/1068 |
| 10,540,297 B2 | * | 1/2020 | Saileshwar | G06F 21/79 |

(Continued)

*Primary Examiner* — Matthew M Kim
*Assistant Examiner* — Matthew N Putaraksa
(74) *Attorney, Agent, or Firm* — Isidore PLLC (57) ABSTRACT

A method, an information handling system (IHS) and a memory mirroring system for operating a mirrored memory. The method includes detecting, via a memory controller, at least one uncorrectable data error (UCDE) in a first memory device. In response to detecting the at least one UCDE, a UCDE event counter is retrieved that tracks the number of UCDE events that have occurred and a UCDE event threshold is retrieved corresponding to a maximum number of allowed UCDE events. The method further includes determining if the UCDE event counter is greater than the UCDE event threshold and in response to determining that the UCDE event counter is not greater than the UCDE event threshold, continuing writing of data to the first memory device via a first memory channel and continuing writing of the data to a second memory device via a second memory channel to create a mirror of the data.

20 Claims, 7 Drawing Sheets

(56) References Cited

U.S. PATENT DOCUMENTS

| | | | |
|---|---|---|---|
| 2005/0022078 A1* | 1/2005 | Subramanian | G06F 11/1666 714/710 |
| 2008/0141077 A1* | 6/2008 | Swanson | G06F 11/008 714/48 |
| 2010/0005219 A1* | 1/2010 | Loughner | G11C 7/02 711/5 |
| 2010/0106904 A1* | 4/2010 | Berke | G06F 12/0866 711/114 |
| 2010/0115330 A1 | 5/2010 | Khatri et al. | |
| 2011/0087824 A1* | 4/2011 | Lin | G06F 13/387 711/103 |
| 2011/0219274 A1* | 9/2011 | Cho | G06F 11/00 714/708 |
| 2013/0138901 A1* | 5/2013 | Cordero | G06F 11/3058 711/162 |
| 2013/0151767 A1 | 6/2013 | Berke et al. | |
| 2015/0309899 A1 | 10/2015 | Woo et al. | |
| 2016/0048345 A1* | 2/2016 | Vijayrao | G06F 3/0613 710/28 |
| 2016/0062821 A1* | 3/2016 | Yoon | G06F 11/1471 714/763 |
| 2018/0034485 A1* | 2/2018 | Marelli | G11C 16/3422 |
| 2018/0089035 A1 | 3/2018 | Woo et al. | |
| 2018/0150347 A1 | 5/2018 | Chinnakkonda Vidyapoornachary et al. | |
| 2018/0157565 A1* | 6/2018 | Warnes | G06F 11/1456 |
| 2019/0163557 A1* | 5/2019 | Nguyen | G11C 29/883 |
| 2020/0210108 A1* | 7/2020 | Palmer | G06F 3/0604 |
| 2021/0042183 A1* | 2/2021 | Adamski | F02C 7/32 |

\* cited by examiner

MEMORY MIRRORING IN AN INFORMATION HANDLING SYSTEM

BACKGROUND

1. Technical Field

The present disclosure generally relates to information handling systems and in particular to memory mirroring in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling system can include memory devices that store data. Memory mirroring is a technique where memory content is written to two different physical memory locations, providing a redundant copy of the memory content in a mirrored memory location. When a write is performed to a primary memory location, another write is generated to a backup or mirrored memory location. If an error is detected in the primary memory location, writing is stopped to the primary memory location and data is read from the backup or mirrored memory location.

BRIEF SUMMARY

Disclosed are a method, an information handling system (IHS) and a memory mirroring system for operating a mirrored memory.

According to one embodiment, the method includes detecting, via a memory controller, at least one uncorrectable data error (UCDE) in a first memory device. The memory controller is communicatively connected with the first memory device via a first memory channel. The memory controller is further communicatively connected with a second memory device via a second memory channel. The first and second memory devices operate as mirrored memory devices, such that the second memory device contains a mirrored copy of data stored on the first memory device. In response to detecting the at least one UCDE, the method further includes retrieving a UCDE event counter that tracks the number of UCDE events that have occurred in the first memory channel and retrieving a UCDE event threshold corresponding to a maximum number of allowed UCDE events. The method also includes updating the UCDE event counter to account for the detected UCDE and determining if the UCDE event counter is greater than the UCDE event threshold. The method further includes, in response to determining that the UCDE event counter is not greater than the UCDE event threshold, continuing writing of data to the first memory device via the first memory channel and continuing writing of the data to the second memory device via the second memory channel to create a mirror of the written data.

According to another embodiment, an IHS includes a processor communicatively coupled to a memory controller. The memory controller is communicatively coupled to a first memory device via a first memory channel and to a second memory device via a second memory channel. The first and second memory devices operate as mirrored memory devices, such that the second memory device contains a mirrored copy of data stored on the first memory device. The memory controller has firmware executing thereon that configures the memory controller to detect at least one UCDE in either the first memory device or the second memory device. In response to detecting the at least one UCDE in the first memory device, the memory controller retrieves a UCDE event counter that tracks the number of UCDE events that have occurred in the first memory channel and retrieves a UCDE event threshold corresponding to a maximum number of allowed UCDE events. The memory controller determines if the UCDE event counter is greater than the UCDE event threshold. In response to determining that the UCDE event counter is not greater than the UCDE event threshold, the memory controller continues writing of data to the first memory device via the first memory channel and continues writing of the data to the second memory device via the second memory channel to create a mirror of the written data.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method, an information handling system (IHS) and a memory mirroring system for operating a mirrored memory.

The method includes detecting, via a memory controller, at least one uncorrectable data error (UCDE) in a first memory device. The memory controller is in communication with the first memory device via a first memory channel. The memory controller further in communication with a second memory device via a second memory channel. The second memory device containing a mirrored copy of data stored on the first memory device. In response to detecting the at least one UCDE, the method further includes retrieving a UCDE event counter that tracks the number of UCDE events that have occurred in the first memory channel and retrieving a UCDE event threshold corresponding to a maximum number of allowed UCDE events. The method also includes determining if the UCDE event counter is greater than the UCDE event threshold and in response to determining that the UCDE event counter is not greater than the UCDE event threshold, continuing writing of data to the first memory device via the first memory channel and continuing writing of the data to the second memory device via the second memory channel to create a mirror of the written data.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
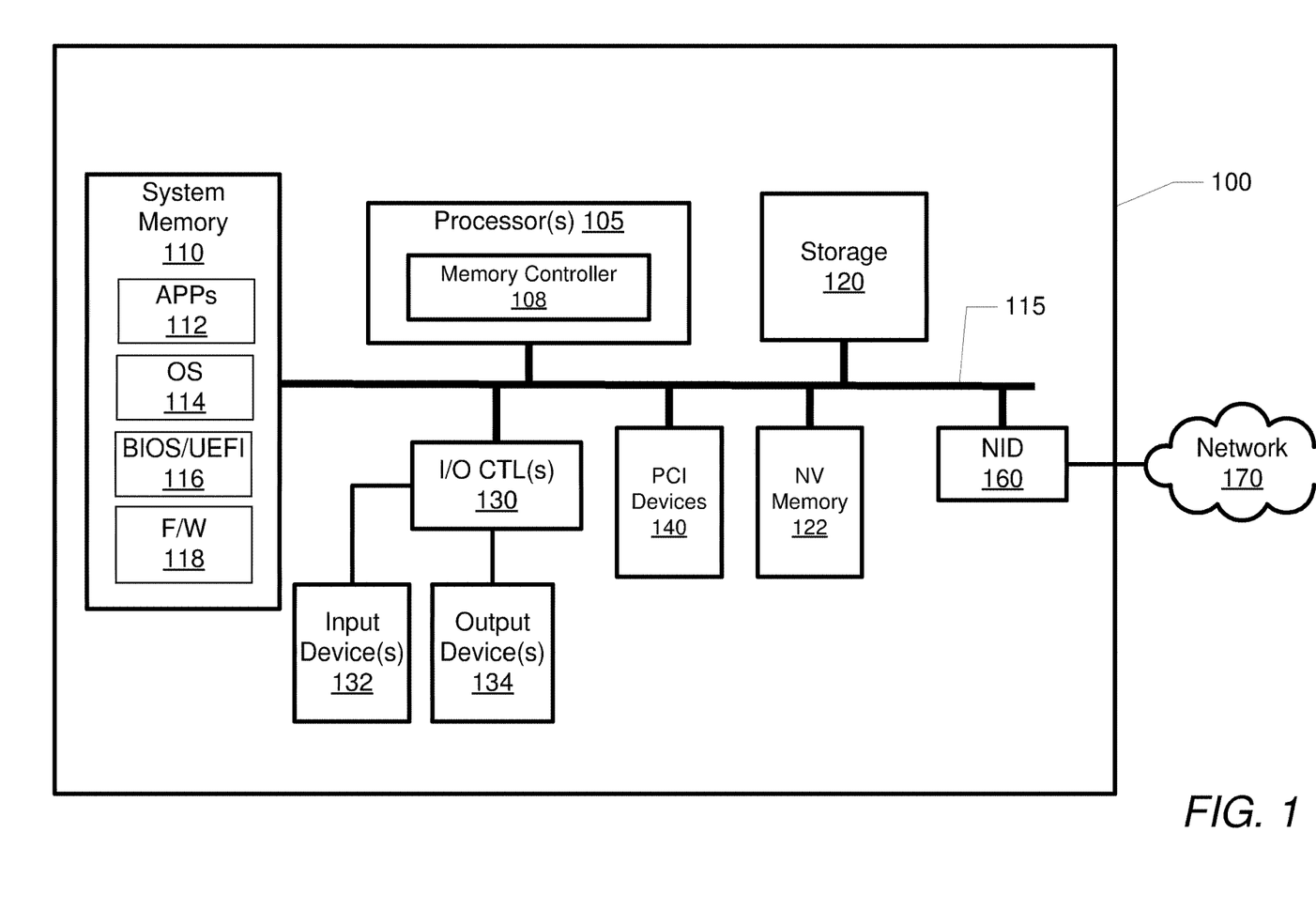
FIG. 1 illustrates one example of an IHS within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 105 coupled to system memory 110 via system interconnect 115. System interconnect 115 can be interchangeably referred to as a system bus, in one or more embodiments. Processor(s) 105 can include an internal integrated memory controller 108. In another embodiment, memory controller 108 can be a device separate from processor 105. Memory controller 108 contains the logic and functions necessary to read and write to system memory 110.

Also coupled to system interconnect 115 is storage 120 within which can be stored one or more software and/or firmware modules and/or data (not specifically shown). In one embodiment, storage 120 can include one or more hard drives or solid state drives that are mounted within a system enclosure as will be described below. The one or more software and/or firmware modules within storage 120 can be loaded into system memory 110 during operation of IHS 100. As shown, system memory 110 can include therein a plurality of software and/or firmware modules including application(s) 112, operating system (OS) 114, basic input/output system (BIOS) 116, and firmware (F/W) 118. Non-volatile (NV) memory 122 is also coupled to system interconnect 115.

In one or more embodiments, BIOS 116 comprises additional functionality associated with unified extensible firmware interface (UEFI), and can be more completely referred to as BIOS/UEFI in these embodiments. The various software and/or firmware modules have varying functionality when their corresponding program code is executed by processor(s) 105 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s) or light emitting diodes (LEDs). Additionally, in one or more embodiments, system interconnect 115 is further coupled to peripheral component interconnect (PCI) devices 140. PCI devices 140 can include modems, network cards, sound cards, video cards, shared memory, solid state drives, and other hardware devices.

IHS 100 further comprises a network interface device (NID) 160. NID 160 enables IHS 100 to communicate and/or interface with other devices, services, and components that are located external to IHS 100. These devices, services, and components can interface with IHS 100 via an external network, such as example network 170, using one or more communication protocols. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

Figure 2:
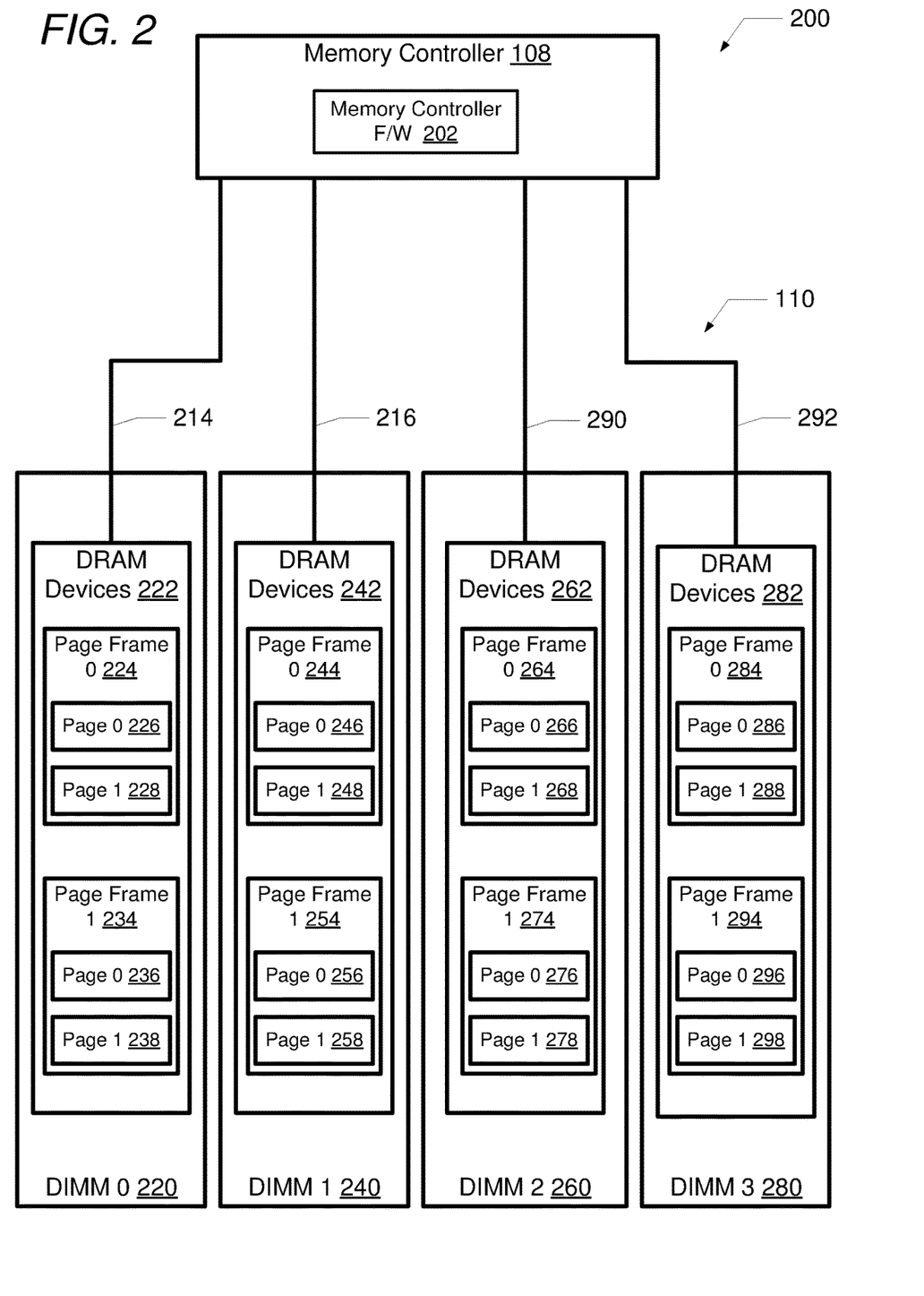
FIG. 2 illustrates an example block diagram of a mirrored memory system, in accordance with one or more embodiments.

In the discussion of the following figures, the description of each figure can include general reference to the specific components illustrated within the preceding figures. Turning to FIG. 2, there is illustrated example memory system 200. Memory system 200 includes memory controller 108 and system memory 110. Memory controller 108 includes memory controller F/W 202 that enables memory controller 108 to read and write to system memory 110 in a redundant or mirrored memory mode. Memory controller F/W 202 performs the processes presented in the flowcharts of FIGS. 4, 5A-B and 6. System memory 110 comprises several dual inline memory modules (DIMM) including DIMM 0 220, DIMM 1 240, DIMM 2 260 and DIMM 3 280. Memory controller 108 is communicatively coupled to each of the DIMMs, including DIMM 0 220, DIMM 1 240, DIMM 2 260 and DIMM 3 280 via a corresponding memory channel. Each DIMM includes one or more dynamic random access memory devices (DRAM) that are mounted to a printed circuit board.

DIMM 0 220 includes DRAM devices 222 that are coupled to memory controller 108 via primary memory channel 214. DIMM 1 240 includes DRAM devices 242 that are coupled to memory controller 108 via backup memory channel 216. DIMM 0 220 and DIMM 1 240 operate as mirrored memory devices. DIMM 3 260 includes DRAM devices 262 that are coupled to memory controller 108 via primary memory channel 290. DIMM 3 280 includes DRAM devices 282 that are coupled to memory controller 108 via backup memory channel 292. DIMM 3 260 and DIMM 4 280 operate as mirrored memory devices. Memory channels 214, 216, 290 and 292 are communication channels that allow the transfer of data between memory controller 108 and the DRAM devices. While four DIMMs are show in FIG. 2, IHS 100 can include hundreds of DIMMs. In a redundant or mirrored memory operation mode, memory controller 108 reads from DRAM devices of the primary memory channel (214 and 290) and writes to DRAM devices of both primary and backup memory channels (216 and 292).

DRAM devices 222 can store data in page frame 0 224 and page frame 1 234. Page frame 0 224 includes page 0 226 and page 1 228. Page frame 1 234 includes page 0 236 and page 1 238. DRAM devices 242 can store data in page frame 0 244 and page frame 1 254. Page frame 0 244 includes page 0 246 and page 1 248. Page frame 1 254 includes page 0 256 and page 1 258. DRAM devices 262 can store data in page frame 0 264 and page frame 1 274. Page frame 0 264 includes page 0 266 and page 1 268. Page frame 1 274 includes page 0 276 and page 1 278. DRAM devices 282 can store data in page frame 0 284 and page frame 1 294. Page frame 0 284 includes page 0 286 and page 1 288. Page frame 1 294 includes page 0 296 and page 1 298. While DRAM devices 222, 242, 262 and 282 are illustrated having two page frames with each page frame containing two pages, it is contemplated that the DRAM devices can be comprised of more or fewer page frames and pages.

A page frame is the smallest fixed-length contiguous block of physical memory into which pages (i.e., page 0 226-296 and page 1 228-298) are mapped by OS 114. A page is a fixed-length contiguous block of virtual memory. In FIG. 2, pages are the smallest unit of data for memory management in a virtual memory operating system.

During conventional mirrored memory operations, memory controller 108 can read data from DRAM devices of the primary memory channel and write data to DRAM devices of both primary and backup memory channels. If an uncorrectable data error (UCDE) occurs during reading of the primary memory channel, the memory controller reads and writes to the backup memory channel without redundancy. In one embodiment, if another UCDE occurs during reading of the backup memory channel, a machine check exception (MCE) interrupt is generated to the OS and IHS 100 can crash as a result. The present disclosure enables the prevention of triggered system interrupts and/or system crashes when the occurrence/detection of a second UCDE occurs. Memory controller 108 executing memory controller F/W 202 allows the continued reading and writing of data to one or more memory channels after the occurrence of one or more UCDEs. The present disclosure further enables the disabling of a memory channel, when the UCDE event counter for the memory channel exceeds the UCDE event threshold value.

Figure 3A:
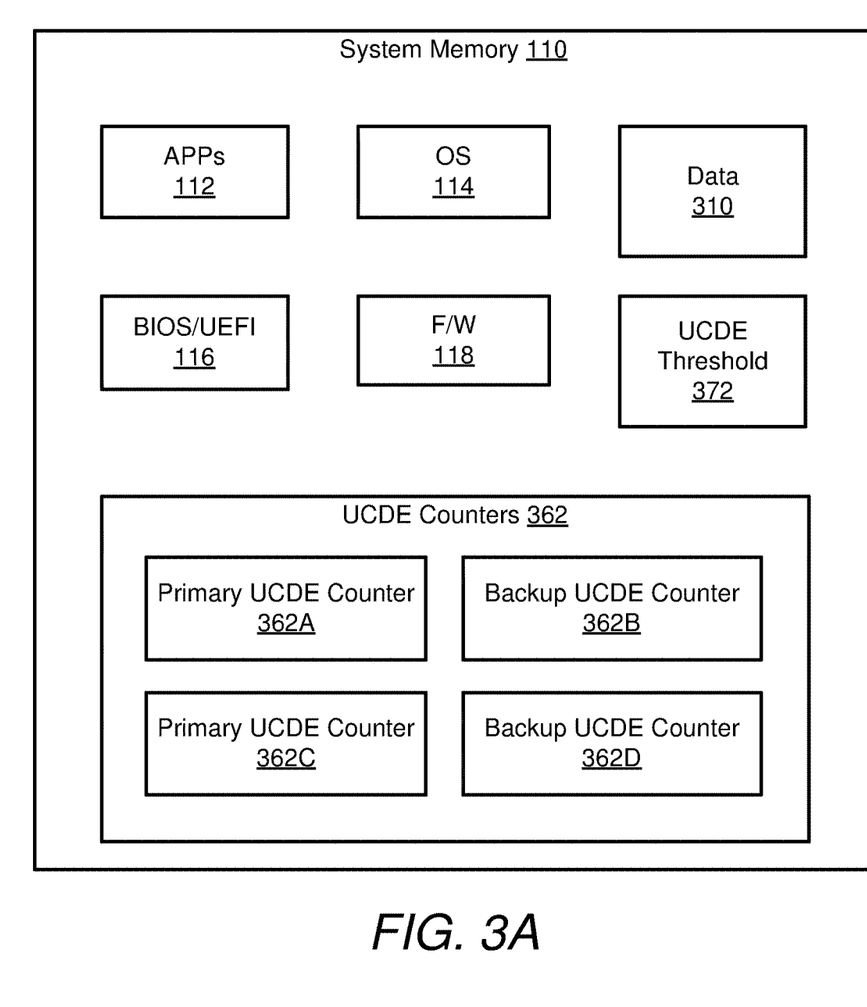
FIG. 3A illustrates example contents of a system memory, in accordance with one or more embodiments.

With reference now to FIG. 3A, one embodiment of example contents of system memory 110 (FIG. 1) is shown. System memory 110 can include application(s) 112, operating system (O/S) 114, basic input/output system (BIOS) 116 and firmware (F/W) 118. System memory 110 further includes data 310. Data 310 can be stored in the pages of DRAM devices 222, 242, 262 and 282.

System memory 110 further includes uncorrectable data error (UCDE) counters 362 and UCDE threshold 372. UCDE counters 362 include primary memory channel UCDE counters 362A, 362C and backup memory channel UCDE counters 362B, 362D. The UCDE counters 362 track a count of the number of times a UCDE has occurred for each of the primary and backup memory channels within system memory 110. For example, primary memory channel UCDE counter 362A tracks UCDEs for primary memory channel 214 and backup memory channel UCDE counter 362B tracks UCDEs for backup memory channel 216. Primary memory channel UCDE counter 362C tracks UCDEs for primary memory channel 290 and backup memory channel UCDE counter 362d can track UCDEs for backup memory channel 292. While four memory channel UCDE counters are shown, IHS 100 can include hundreds of memory channel UCDE counters. The discussion of the following figures will be illustrated with reference to only primary memory channel UCDE counter 362A and backup memory channel UCDE counter 362B. A UCDE occurs when a UCDE system management interrupt (SMI) is generated by memory controller 108. A UCDE SMI is generated when data is determined to be corrupt and is not correctable with error correcting code (ECC). UCDE counters 362A-D are initially set to zero during booting of IHS 100. UCDE threshold 372 is a maximum number of UCDEs that are allowed for either a primary or backup memory channel before the respective primary or backup memory channel is disabled. UCDE threshold 372 is pre-determined and supplied to IHS 100 either during a provisioning process or during booting. In one embodiment, UCDE threshold 372 can have values ranging between 5 and 30.

Figure 3B:
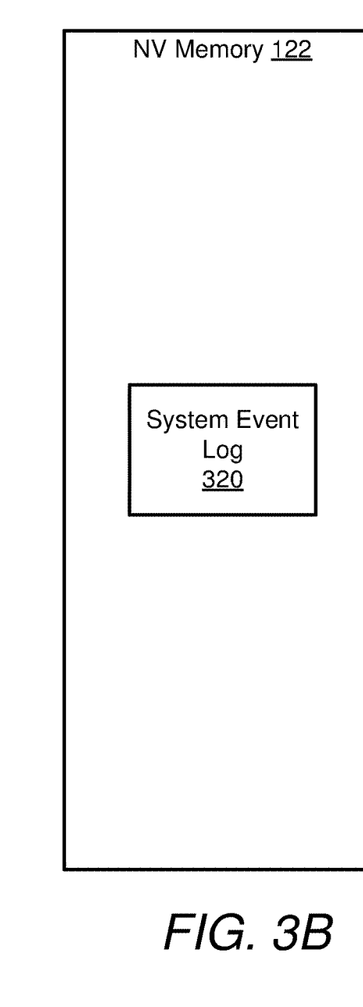
FIG. 3B illustrates example contents of a non-volatile memory, in accordance with one or more embodiments.

Turning to FIG. 3B, NV memory 122 contains system event log (SEL) 320. System event log 320 contains error messages and data about software and hardware problems within IHS 100. In one embodiment, SEL 320 can contain a memory mirror redundancy lost event that identifies one or more DIMMS that require replacement during maintenance of IHS 100.

Memory controller F/W 202 enables memory controller 108 to read and write to system memory 110 in a redundant or mirrored memory mode. Memory controller F/W 202 further enables memory controller 108 to continue to provide redundant or mirrored memory operations via two memory channels after one or more UCDEs have been detected.

In one embodiment, memory controller 108, executing memory controller F/W 202, detects at least one UCDE in DRAM devices 222. Memory controller 108 is in communication with DRAM devices 222 via primary memory channel 214. Memory controller 108 is further in communication with DRAM devices 242 via backup memory channel 216. DRAM devices 242 contain a mirrored copy of data stored on DRAM devices 242. In response to detecting the at least one UCDE, memory controller 108 retrieves UCDE event counters 362A-B that track the number of UCDE events that have occurred in one or more memory channels and retrieves UCDE event threshold 372 corresponding to a maximum number of allowed UCDE events. Memory controller 108 determines if the UCDE event counters 362A and/or 362B are greater than the UCDE event threshold 372. In response to determining that the UCDE event counters 362A and/or 362B are not greater than the UCDE event threshold 372, memory controller 108 continues writing of data to DRAM devices 222 via the primary memory channel 214 and continues writing of data to DRAM devices 242 via the backup memory channel to create a mirror of the data. Accordingly, the occurrence/detection of just a second UCDE does not automatically trigger a system interrupt and/or system crash. Further, when the UCDE event counter for a memory channel exceeds the UCDE event threshold value, the memory channel that exceeded the UCDE event threshold value is disabled by memory controller 108. In another embodiment, processor 105, executing OS 114 can map out and retire memory pages that are associated with UCDEs to prevent further UCDEs from occurring.

FIGS. 4, 5A-B, and 6 illustrate flowcharts of exemplary methods 400, 500, and 600 by which memory controller 108 within the preceding figures performs different aspects of the processes that enable the one or more embodiments of the disclosure. Generally, methods 400, 500, and 600 represent computer-implemented methods for operating a mirrored memory system. The description of methods 400, 500, and 600 is provided with general reference to the specific components illustrated within the preceding FIGS. 1-3. Methods 400, 500 and 600 are described as being implemented via memory controller 108 and particularly the execution of code provided by memory controller F/W 202 within memory controller 108. It is however appreciated that certain aspects of the described methods may be implemented via other processing devices and/or execution of other code.

Figure 4:
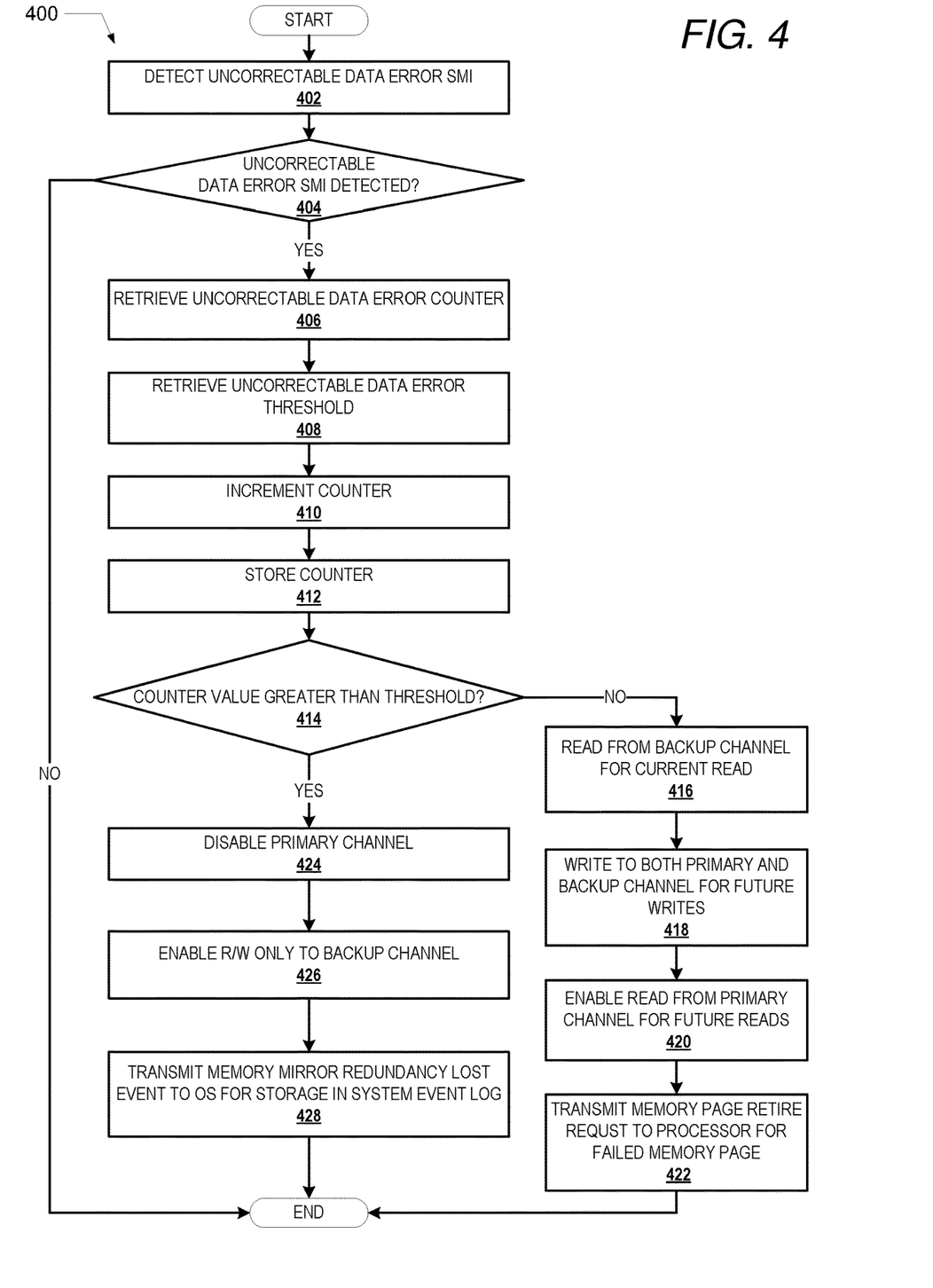
FIG. 4 is a flow chart illustrating one example of a method for operating a mirrored memory system, that continues writing data to both primary and backup memory channels when an error occurs, according to one or more embodiments.

Referring to the flow chart of FIG. 4, method 400 begins at the start block and proceeds to block 402 where memory controller 108 detects the occurrence of UCDE SMI events. The UCDE SMI events are generated when data contained in a specific memory page within a primary memory channel of system memory 110 is determined to be corrupt and is not correctable with ECC. Memory controller 108 determines if a UCDE SMI or error has been detected during a memory read operation (decision block 404). In response to determining that a UCDE SMI or error has not been detected during the memory read operation, method 400 terminates at the end block. In response to determining that a UCDE SMI or error has been detected during the memory read operation, memory controller 108 retrieves UCDE counters 362 from system memory 110 (block 406) and retrieves UCDE threshold 372 from system memory 110 (block 408). Memory controller 108 increments the corresponding UCDE counter 362 (i.e., UCDE counter 362A) by one (block 410) and stores UCDE counters 362 to system memory 110 (block 412). UCDE counters 362 are initially set to zero during booting of IHS 100.

Memory controller 108 determines if the value of UCDE counter 362A is greater than the value of UCDE threshold 372 (decision block 414). In response to determining that the value of UCDE counter 362A is not greater than the value of UCDE threshold 372, memory controller 108 performs a read for the current read operation from the backup memory channel associated with the primary memory channel (e.g., backup memory channel 216 to DRAM devices 242) (block 416). Memory controller 108 enables writing to the DRAM devices via both primary and backup memory channels (e.g., to both primary memory channel 214 and backup memory channel 216) for future or subsequent write operations (block 418). Memory controller 108 enables reading to the DRAM devices via primary memory channels, (e.g., primary memory channels 214 and 290), for the next and future or subsequent read operations (block 420). Memory controller 108 transmits, to processor 105 executing OS 114, a memory page retire request for the specific failed memory page, (i.e., page 0 226), associated with the UCDE SMI (block 422). The OS 114 can map out and retire the specific memory page to prevent further UCDE from occurring. Method 400 then concludes at the end block.

In response to determining that the value of UCDE counter 362A is greater than the value of UCDE threshold 372, memory controller 108 disables the primary memory channel (e.g., primary memory channel 214) (block 424) Disabling the primary memory channel prevents future/ subsequent memory operations via the primary memory channel. Memory controller 108 enables the current operation and subsequent memory operations (both reading and writing) via only the backup memory channel (e.g., backup memory channel 216) (block 426). Memory controller 108 transmits a memory mirror redundancy lost event to processor 105 for storage to SEL 320 (block 428). Method 400 then ends.

Figure 5A:
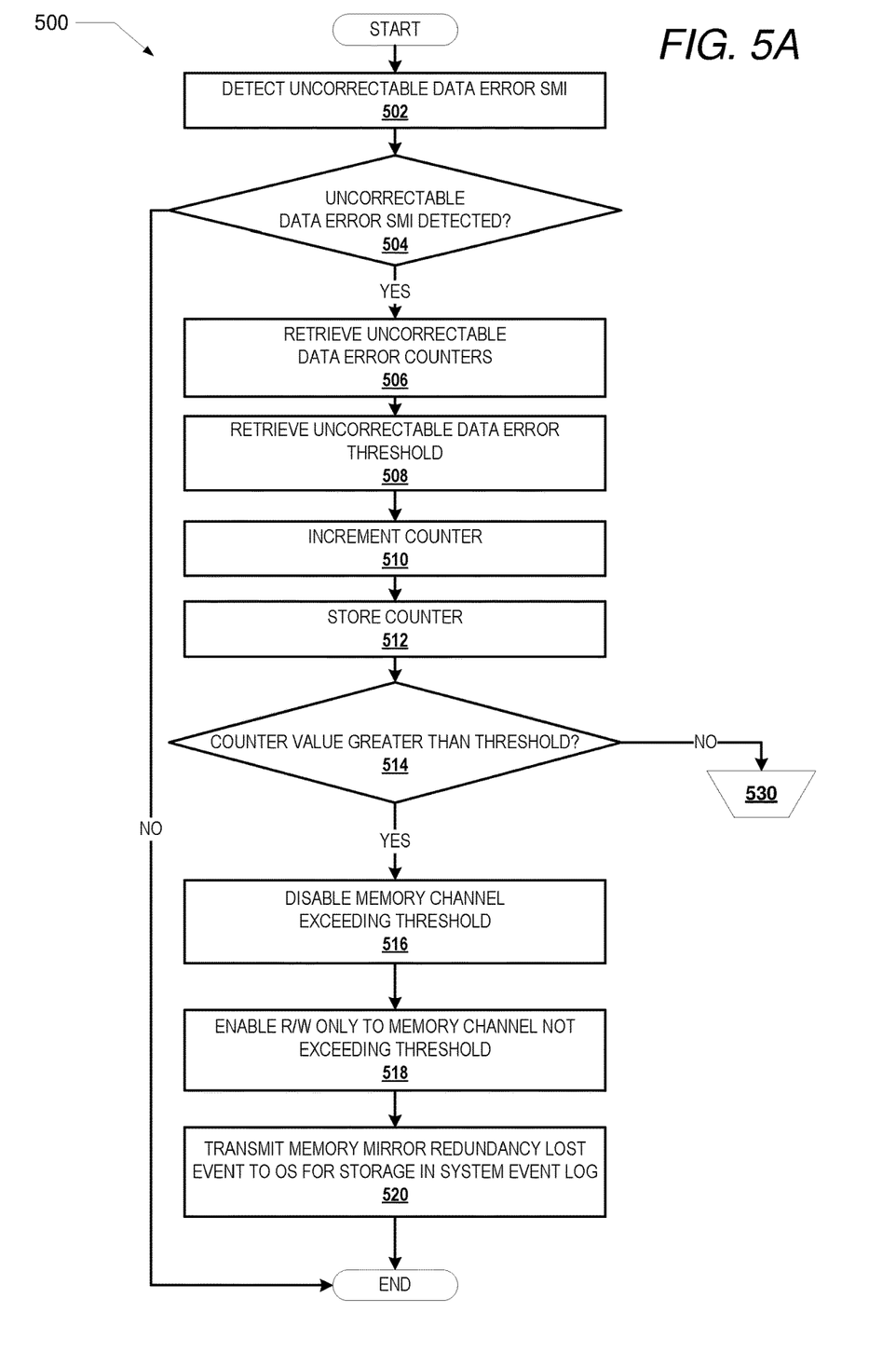
FIGS. 5A-B is a flow chart illustrating another example of a method for operating a mirrored memory system that uses alternating memory channels for reading data when an error occurs, according to one or more embodiments.
Figure 5B:
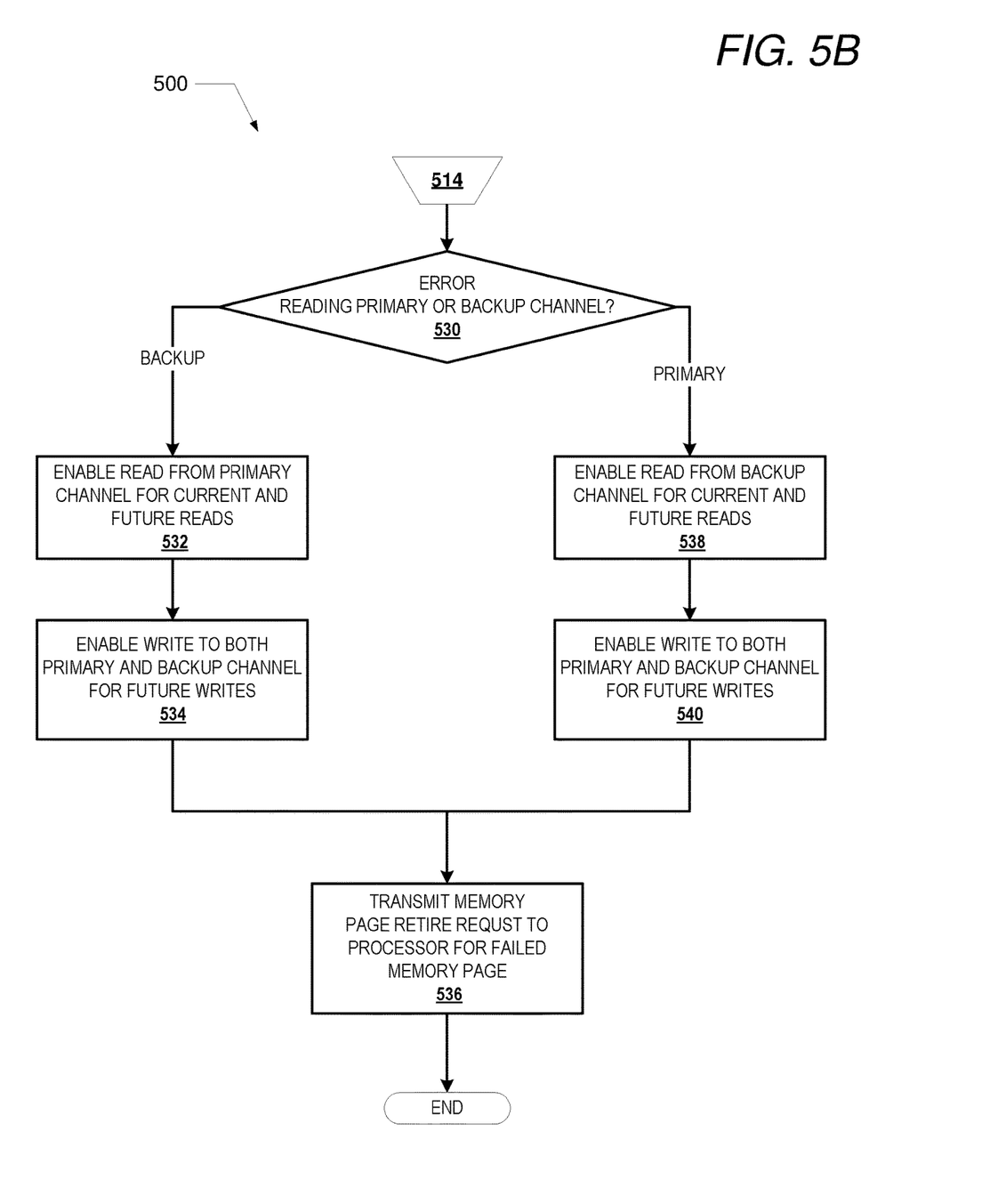

FIGS. 5A-B illustrate another method 500 for operating a mirrored memory system that uses alternating memory channels for reading data when a UCDE occurs. Referring to the flow chart of FIG. 5A, method 500 begins at the start block and proceeds to block 502 where memory controller 108 detects the occurrence of UCDE SMI events that are generated when data contained in a specific memory page within a primary or backup memory channel of system memory 110 is determined to be corrupt and is not correctable with ECC. Memory controller 108 determines if a UCDE SMI has been detected (decision block 504). In response to determining that a UCDE SMI has not been detected, method 400 ends. In response to determining that a UCDE SMI has been detected, memory controller 108 retrieves UCDE counter 362 (block 506) and retrieves UCDE threshold 372 (block 508). Memory controller 108 increments the respective UCDE counter 362 associated with the UCDE SMI (i.e., UCDE counter 362A or 362B) by one (block 510) and stores UCDE counters 362 to system memory 110 (block 512). UCDE counters 362 are initially set to zero during booting of IHS 100.

Memory controller 108 determines if the value of UCDE counter 362A or 362B is greater than the value of UCDE threshold 372 (decision block 514). In response to determining that the value of UCDE counter 362A or 362B is greater than the value of UCDE threshold 372, memory controller 108 disables the memory channel that exceeded the UCDE threshold, (e.g., primary memory channel 214 or backup memory channel 216), (block 516). Disabling the primary or backup memory channel prevents memory operations via the disabled memory channel. Memory controller 108 enables memory operations (reading and writing) via only the memory channel that did not exceed the UCDE threshold, (e.g., primary memory channel 214 or backup memory channel 216), (block 518). Memory controller 108 transmits a memory mirror redundancy lost event to processor 105, executing OS 114, for storage to SEL 320 (block 520). Method 500 then terminates.

Turning to FIG. 5B, in response to determining that the value of UCDE counters 362 are not greater than the value of UCDE threshold 372, memory controller 108 determines or identifies if the UCDE occurred during reading of one of the primary memory channels 214 or 290 or during reading of one of the backup memory channels 216 or 292 (decision block 530). In response to identifying that the UCDE occurred during reading of one of the backup memory channels (e.g., backup memory channel 216), memory controller 108 enables reading (for both current and future memory read operations) from the primary memory channel, (e.g. primary memory channel 214) that is associated with the backup memory channel (block 532). Memory controller 108 enables continued writing (for both current and future memory write operations) to both the primary memory channel, (e.g. primary memory channel 214), and the backup memory channel, (e.g. backup memory channel 216) (block 534). Memory controller 108 transmits a memory page retire request to processor 105 executing OS 114 for the specific failed memory page (i.e., page 0 246) associated with the UCDE SMI (block 536). Method 500 then concludes at the end block.

In response to identifying that the UCDE occurred during reading of one of the primary memory channels, (e.g., primary memory channel 214), memory controller 108 enables reading (for both current and future memory read operations) from the backup memory channel (e.g. primary memory channel 216) associated with the backup memory channel (block 538). Memory controller 108 enables continued writing to both the primary memory channel (e.g. primary memory channel 214) and the backup memory channel, (e.g. backup memory channel 216), for both current and future memory write operations (block 540). Memory controller 108 transmits a memory page retire request to processor 105 executing OS 114 for the specific failed memory page, (i.e., page 0 226), associated with the UCDE SMI (block 536). Method 500 then concludes at the end block.

Figure 6:
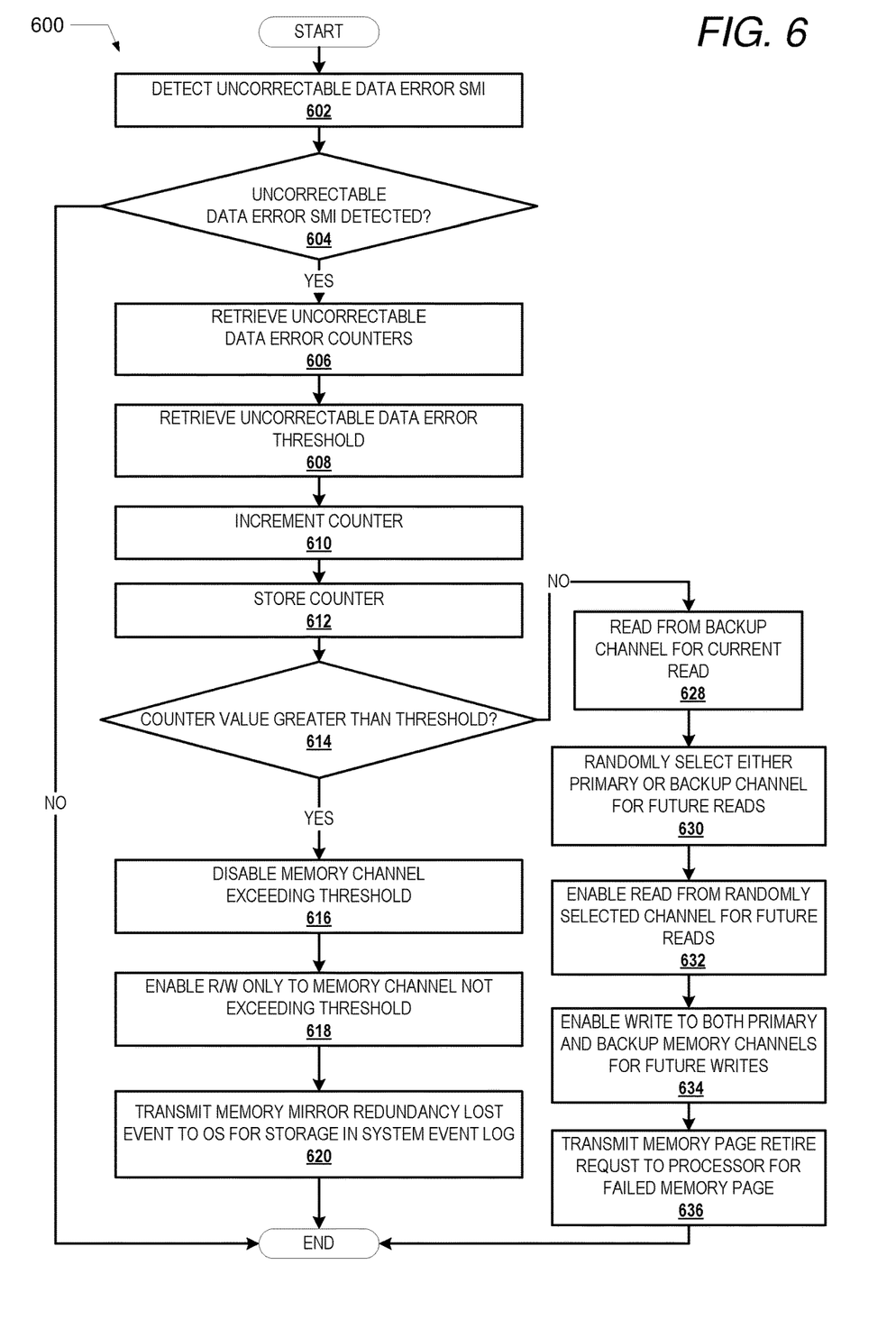
FIG. 6 is a flow chart illustrating an additional example of a method for operating a mirrored memory system that uses a randomly selected memory channel for reading data when an error occurs, according to one or more embodiments.

FIG. 6 illustrates an additional method 600 for operating a mirrored memory system that uses a randomly selected memory channel for writing data when an error occurs. Referring to the flow chart of FIG. 6, method 600 begins at the start block and proceeds to block 602. Memory controller 108 detects the occurrence of UCDE SMI events that are generated when data contained in a specific memory page within a primary or backup memory channel of system memory 110 is determined to be corrupt and is not correctable with ECC. Memory controller 108 determines if a UCDE SMI has been detected (decision block 604). In response to determining that a UCDE SMI has been detected, memory controller 108 retrieves UCDE counters 362 (block 606) and retrieves UCDE threshold 372 (block 608). Memory controller 108 increments the respective UCDE counter 362 associated with the UCDE SMI where the error was detected (i.e., UCDE counter 362A or 362B) by one (block 610) and stores UCDE counters 362 to system memory 110 (block 612). UCDE counters 362 are initially set to zero during booting of IHS 100.

Memory controller 108 determines if the value of UCDE counter 362A or 362B is greater than the value of UCDE threshold 372 (decision block 614). In response to determining that the value of UCDE counter 362A or 362B is greater than the value of UCDE threshold 372, memory controller 108 disables the memory channel that exceeded the UCDE threshold, (e.g., primary memory channel 214 or backup memory channel 216), (block 616). Disabling the memory channel prevents memory operations via the memory channel that exceeded the UCDE threshold. Memory controller 108 enables memory operations (reading and writing) via only the memory channel that did not exceed the UCDE threshold, (e.g., primary memory channel 214 or backup memory channel 216), (block 618). Memory controller 108 transmits a memory mirror redundancy lost event to processor 105 for storage to SEL 320 (block 620). Method 600 then ends.

In response to determining that the value of UCDE counters 362 is not greater than the value of UCDE threshold 372, memory controller 108 performs a read for the current read operation from the backup memory channel associated with the primary memory channel (e.g., backup memory channel 216 to DRAM devices 242), assuming that the UCDE occurred while reading from the primary memory channel (block 628). If the UCDE had occurred while reading from the backup memory channel, memory controller 108 would perform a read for the current read operation from the primary memory channel at block 628. Memory controller 108 randomly selects either one of primary memory channel, (e.g., primary memory channel 214), or backup memory channel, (e.g., backup memory channel 216), for future memory read operations (block 630). Memory controller 108 enables future memory read operations from the randomly selected memory channel (block 632). For example, if memory controller 108 selects primary memory channel 214, future memory read operations will be enabled to DRAM devices 222 via primary memory channel 214. Memory controller 108 enables continued writing to both the primary memory channel (e.g. primary memory channel 214) and the backup memory channel, (e.g. backup memory channel 216, for both current and future memory write operations (block 634). Memory controller 108 transmits a memory page retire request to processor 105 executing OS 114 for the specific failed memory page, (i.e., page 0 226), associated with the UCDE SMI (block 636). The OS can map out and retire the memory page to prevent further UCDE from occurring. Method 600 then concludes at the end block.

In the above described flow charts, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of memory mirroring in an information handling system (IHS), the method comprising:
   detecting, via a memory controller, at least one uncorrectable data error (UCDE) in one of a first memory device and a second memory device, the memory controller in communication with the first memory device via a first memory channel, the memory controller further in communication with the second memory device via a second memory channel, the second memory device containing a mirrored copy of data stored on the first memory device, each of the first and the second memory device comprising a UCDE event counter that tracks a number of UCDE events that have occurred within a respective one of the first and the second memory channel, the UCDE event counter initially set to zero during booting of the IHS, each of the first and the second memory devices being a volatile Dual Inline Memory Module (DIMM) having at least one dynamic random access memory (DRAM) device with a plurality of separately addressable pages of data, the first memory channel being a primary memory channel and the second memory channel being a backup memory channel for enabling mirroring of data stored in the first DIMM;
   in response to detecting the at least one UCDE in the first memory device during a read operation:
      retrieving a first UCDE event counter that tracks the number of UCDE events that have occurred generally with the first memory device;
      retrieving a first UCDE event threshold corresponding to a maximum number of allowed UCDE events for the first memory device;
      determining if the first UCDE event counter is greater than the first UCDE event threshold; and
      in response to determining that the first UCDE event counter is not greater than the first UCDE event threshold:
         processing a first received read operation that triggered detection of the UCDE by reading associated data from the second memory device via the second memory channel;
         initiating processing of at least one subsequent read operation, following the first received read operation, by first forwarding the at least one subsequent read operation to the second memory device via the second memory channel for processing rather than to the first memory device via the first memory channel;
         in response to detecting a later UCDE in the second memory device during processing of the at least one subsequent read operation at the second memory device, switching back to first reading data from the first memory device via the first memory channel and forwarding the at least one subsequent read operation to the first memory device for processing; and
         continuing writing of data both to the first memory device via the first memory channel and to the second memory device via the second memory channel to create a mirror of the data at a time of writing the data to the first memory device, wherein the memory controller continues to provide redundant, mirrored memory operations via the first and second memory channels after one or more UCDEs have been detected and switches the memory channel used to process reads between the first and second memory channel in response to each detection of a UCDE, as long as a total number of UCDEs at a corresponding one of the first and the second memory device does not exceed a respective UCDE event threshold.

2. The method of claim 1, further comprising:
   in response to detecting the UCDE in the first memory device, processing only a first received read operation that triggered detection of the UCDE by reading data from the second memory device via the second memory channel; and
   enabling reading of data from the first memory device via the first memory channel for subsequent read operations.

3. The method of claim 1, further comprising:
   detecting the additional UCDE in a respective one of the first memory device and the second memory device that is currently being utilized to process a current read operation;
   identifying in which of the first memory device and the second memory device the additional UCDE occurred; and
   in response to identifying that the additional UCDE occurred in the first memory device: processing the current read operation that triggered detection of the additional UCDE by reading data from the second memory device via the second memory channel; and
   enabling reading from the second memory device via the second memory channel for subsequent read operations until a subsequent UCDE is detected at the second memory device.

4. The method of claim 3, further comprising:
   in response to identifying that the additional UCDE occurred in the second memory device, processing the current read operation that triggered detection of the additional UCDE by reading data from the first memory device via the first memory channel; and
   enabling reading from the first memory device via the first memory channel for subsequent read operations until the subsequent UCDE is detected at the first memory device.

5. The method of claim 1, further comprising:
   detecting an additional UCDE in a respective one of the first memory device and the second memory device;
   processing a current read operation that triggered detection of the additional UCDE by reading data from the other one of the first and the second memory device not providing the additional UCDE; and
   in response to receiving subsequent read operations:
      randomly selecting either the first or the second memory channel; and
      enabling reading of data from the memory device associated with the randomly selected memory channel for the subsequent read operations.

6. The method of claim 1, further comprising:
in response to determining that the first UCDE event counter is greater than the first UCDE event threshold:
   disabling the first memory channel to prevent memory operations to the first memory device;
   transferring a current memory operation and subsequent memory operations to the second memory device via the second memory channel; and
   transmitting a memory mirror redundancy lost event to the processor for storage to a system event log (SEL) in non-volatile memory, the SEL containing at least one memory mirror redundancy lost event that identifies one or more dual inline memory modules (DIMMS), having a failed DRAM device, that require replacement during maintenance of the IHS.

7. The method of claim 1, further comprising:
transmitting a memory page retire request to an operating system for a failed memory page associated with the UCDE to trigger the OS to map out and retire the specific memory page and preventing further UCDE from occurring with respect to the specific memory page;
incrementing the UCDE event counter; and
storing the incremented UCDE event counter;
wherein retirement of a failed memory page due to a UCDE does not prevent an affected memory device from continuing to be used for subsequent memory read operations targeting other memory pages within the affected memory device.

8. An information handling system (IHS) comprising:
a processor communicatively coupled to a memory controller, the memory controller communicatively coupled to a first memory device via a first memory channel and a second memory device via a second memory channel, each of the first and the second memory devices being a volatile Dual Inline Memory Module (DIMM) having at least one dynamic random access memory (DRAM) device with a plurality of separately addressable pages of data, the first memory channel being a primary memory channel and the second memory channel being a backup memory channel for enabling mirroring of data stored in the first DIMM, the memory controller having firmware executing thereon that configures the memory controller to:
   detect, during a read operation, at least one uncorrectable data error (UCDE) in at least one of the first memory device and the second memory device, the second memory device containing a mirrored copy of data stored on the first memory device, each of the first and the second memory device comprising a UCDE event counter that tracks a number of UCDE events that have occurred within a respective one of the first and the second memory device, the UCDE counter initially set to zero during booting of the IHS;
   in response to detecting the at least one UCDE in the first memory device, retrieve a first UCDE event counter that tracks the number of UCDE events that have occurred with the first memory device;
   retrieve a UCDE event threshold corresponding to a maximum number of allowed UCDE events;
   determine if the first UCDE event counter is greater than the UCDE event threshold; and
   in response to determining that the UCDE event counter is not greater than the UCDE event threshold:
      process a first received read operation that triggered detection of the UCDE by reading associated data from the second memory device via the second memory channel;
      initiate processing of at least one subsequent read operation, following the first received read operation, by forwarding the at least one subsequent read operation to the second memory device via the second memory channel rather than to the first memory device;
      in response to detecting a later UCDE in the second memory device during processing of the at least one subsequent read operation at the second memory device, switching back to reading data from the first memory device via the first memory channel and forwarding the at least one subsequent read operation to the first memory device for processing; and
      continue writing of data to the first memory device via the first memory channel and to the second memory device via the second memory channel to create a mirror of the data at a time of writing the data to the first memory device, wherein the memory controller continues to provide redundant, mirrored memory operations via the first and second memory channels after one or more UCDEs have been detected and switches the memory channel used to process reads between the first and second memory channel in response to each detection of a UCDE, as long as a total number of UCDEs at a corresponding one of the first and the second memory device does not exceed a respective UCDE event threshold.

9. The information handling system of claim 8, wherein the firmware further configures the memory controller to:
   in response to detecting the UCDE in the first memory device, process a first received read operation that triggered detection of the UCDE by reading data from the second memory device via the second memory channel; and
   enable reading of data from the first memory device via the first memory channel for subsequent read operations.

10. The information handling system of claim 8, wherein the firmware further configures the memory controller to:
   detect an additional UCDE in one of the first memory device and the second memory device that is currently being utilized to process a current read operation;
   identify in which of the first memory device and the second memory device the additional UCDE occurred; and
   in response to identifying that the additional UCDE occurred in the first memory device: process the current read operation that triggered detection of the additional UCDE by reading data from the second memory device via the second memory channel; and enable reading from the second memory device via the second memory channel for subsequent read operations until a subsequent UCDE is detected at the second memory device.

11. The information handling system of claim 10, wherein the firmware further configures the memory controller to:
   in response to identifying that the additional UCDE occurred in the second memory device, process the current read operation that triggered detection of the additional UCDE by reading data from the first memory device via the first memory channel; and enable reading from the first memory device via the first memory channel for subsequent read operations until a subsequent UCDE is detected at the first memory device.

12. The information handling system of claim 8, wherein the firmware further configures the memory controller to:
   detect an additional UCDE in one of the first memory device and the second memory device;
   process a current read operation that triggered detection of the additional UCDE by reading data from a next one of the first memory device and the second memory device via a respective memory channel;
   randomly select either the first or the second memory channel; and
   enable reading of data from the memory device associated with the randomly selected memory channel for subsequent read operations.

13. The information handling system of claim 8, wherein the firmware further configures the memory controller to:
   in response to determining that the UCDE event counter is greater than the UCDE event threshold:
      disable memory operations to the first memory device;
      transfer a current memory operation and subsequent memory operations to the second memory device via the second memory channel; and
      transmit a memory mirror redundancy lost event to the processor for storage to a system event log (SEL) in non-volatile memory, the SEL containing at least one memory mirror redundancy lost event that identifies one or more dual inline memory modules (DIMMS) that require replacement during maintenance of the IHS.

14. The information handling system of claim 8, wherein the firmware further configures the memory controller to:
   transmit a memory page retire request to the processor, the processor executing an operating system (OS), the memory page retire request identifying a failed memory page associated with the UCDE, which triggers the OS to map out and retire the specific memory page and to prevent further UCDE from occurring with respect to the specific memory page;
   increment the UCDE event counter; and
   store the incremented UCDE event counter;
   wherein retirement of a failed memory page due to a UCDE does not prevent an affected memory device from continuing to be used for subsequent memory read operations targeting other memory pages within the affected memory device.

15. A memory mirroring system comprising:
   a memory controller communicatively coupled to a first memory device via a first memory channel and a second memory device via a second memory channel, each of the first and the second memory devices being a volatile Dual Inline Memory Module (DIMM) having at least one dynamic random access memory (DRAM) device with a plurality of separately addressable pages of data, the first memory channel being a primary memory channel and the second memory channel being a backup memory channel for enabling mirroring of data stored in the first DIMM, the memory controller having firmware executing thereon that configures the memory controller to:
      detect at least one uncorrectable data error (UCDE) in one of the first memory device and the second memory device, the second memory device containing a mirrored copy of data stored on the first memory device, each of the first and the second memory device comprising a UCDE event counter that tracks a number of UCDE events that have occurred within a respective one of the first and the second memory device, the UCDE counter initially set to zero during booting of the IHS;
      in response to detecting the at least one UCDE in the first memory device:
         retrieve a first UCDE event counter that tracks the number of UCDE events that have occurred with the first memory device;
         retrieve a UCDE event threshold corresponding to a maximum number of allowed UCDE events;
         determine if the first UCDE event counter is greater than the UCDE event threshold;
         in response to determining that the UCDE event counter is not greater than the UCDE event threshold:
            process a first received read operation that triggered detection of the UCDE by reading associated data from the second memory device via the second memory channel;
            initiate processing of at least one subsequent read operation, following the first received read operation, by forwarding the at least one subsequent read operation to the second memory device via the second memory channel rather than to the first memory device;
            in response to detecting a later UCDE in the second memory device during processing of the at least one subsequent read operation at the second memory device, switching back to reading data from the first memory device via the first memory channel and forwarding the at least one subsequent read operation to the first memory device for processing; and
            continue writing of data to the first memory device via the first memory channel and continue writing of the data to the second memory device via the second memory channel to create a mirror of the data at a time of writing the data to the first memory device, wherein the memory controller continues to provide redundant, mirrored memory operations via the first and second memory channels after one or more UCDEs have been detected and switches the memory channel used to process reads between the first and second memory channel in response to each detection of a UCDE, as long as a total number of UCDEs at a corresponding one of the first and the second memory device does not exceed a respective UCDE event threshold.

16. The memory mirroring system of claim 15, wherein the firmware further configures the memory controller to:
   in response to detecting the UCDE in the first memory device, process a first received read operation that triggered detection of the UCDE by reading data from the second memory device via the second memory channel; and
   enable reading of data from the first memory device via the first memory channel for subsequent read operations.

17. The memory mirroring system of claim 15, wherein the firmware further configures the memory controller to:
   detect an additional UCDE in at least one of the first memory device and the second memory device that is currently being utilized to process a current read operation;

identify in which of the first memory device and the second memory device the additional UCDE occurred; and in response to identifying that the additional UCDE occurred in the first memory device: process the current read operation that triggered detection of the additional UCDE by reading data from the second memory device via the second memory channel; and enable reading from the second memory device via the second memory channel for subsequent read operations.

18. The memory mirroring system of claim 17, wherein the firmware further configures the memory controller to:

in response to identifying that the additional UCDE occurred in the second memory device, process the current read operation that triggered detection of the additional UCDE by reading data from the first memory device via the first memory channel; and enable reading from the first memory device via the first memory channel for subsequent read operations.

19. The memory mirroring system of claim 15, wherein the firmware further configures the memory controller to:

in response to determining that the first UCDE event counter is greater than the UCDE event threshold:
disable memory operations to the first memory device; and transfer a current memory operation and subsequent memory operations to the second memory device via the second memory channel; and transmit a memory mirror redundancy lost event to the processor for storage to a system event log (SEL) in non-volatile memory, the SEL containing at least one memory mirror redundancy lost event that identifies one or more DIMMS that require replacement during maintenance of the IHS.

20. The memory mirroring system of claim 15, wherein the firmware further configures the memory controller to:

transmit a memory page retire request to the processor, the processor executing an operating system (OS), the memory page retire request identifying a failed memory page associated with the UCDE, which triggers the OS to map out and retire the specific memory page and to prevent further UCDE from occurring with respect to the specific memory page;

increment the UCDE event counter; and store the incremented UCDE event counter;

wherein retirement of a failed memory page due to a UCDE does not prevent an affected memory device from continuing to be used for subsequent memory read operations targeting other memory pages within the affected memory device.

* * * * *